United States Patent [19]

Rukavina et al.

[11] 4,339,503
[45] Jul. 13, 1982

[54] PROTECTION OF POLYCARBONATE FROM ULTRAVIOLET RADIATION

[75] Inventors: Thomas G. Rukavina, Lower Burrell; Harold F. Lewis, Arnold, both of Pa.

[73] Assignee: PPG Industries, Inc., Pittsburgh, Pa.

[21] Appl. No.: 239,853

[22] Filed: Mar. 2, 1981

[51] Int. Cl.$^3$ ............................................. B32B 27/36
[52] U.S. Cl. ................................ 428/412; 428/423.1; 428/425.9; 156/309.3
[58] Field of Search .................. 428/412, 423.1, 425.9; 156/309.3

[56] References Cited

U.S. PATENT DOCUMENTS

| | | | |
|---|---|---|---|
| 3,080,266 | 3/1963 | Haslam | 156/309.3 |
| 3,309,219 | 3/1967 | Etherington | 428/412 |
| 4,112,186 | 9/1978 | Lange et al. | 428/412 |

*Primary Examiner*—George F. Lesmes
*Assistant Examiner*—B. K. Johnson
*Attorney, Agent, or Firm*—Donna L. Seidel

[57] ABSTRACT

A method is disclosed for reducing ultraviolet radiation degradation of polycarbonate by means of an ultraviolet radiation screening compound incorporated in a tetrabutyltitanate film which does not interfere with lamination of polyurethane to the polycarbonate surface.

10 Claims, No Drawings

PROTECTION OF POLYCARBONATE FROM ULTRAVIOLET RADIATION

BACKGROUND

The present invention relates generally to the art of reducing ultraviolet radiation degradation of polycarbonate, and relates more particularly to reducing ultraviolet radiation degradation of polycarbonate which is laminated to polyurethane.

Transparent laminates having a variety of desirable properties may be formed from multiple layers of glass, polycarbonate, polyurethane and other materials. However, it is often necessary to treat the surfaces to be bonded or to apply bonding agents to the interfacial areas to be bonded. In addition, it may be desirable, especially if a polymeric surface is to be exposed, to protect the plastic from weathering and abrasion which can deteriorate its optical quality.

U.S. Pat. No. 3,388,032 to Saunders discloses a multiple laminate produced by preparing a prelaminate of polycarbonate sandwiched between sheets of polyurethane, and then laminating the plastic sandwich to glass. The prelaminate is formed by simply pressing a sheet of polycarbonate between two sheets of polyurethane.

U.S. Pat. No. 3,657,057 to Shorr et al discloses improving the adhesion of a cured sheet of polyurethane to a rigid transparent sheet, such as glass or polycarbonate, by interposing a polymerizable polyurethane resin between the cured polyurethane sheet and the rigid transparent sheet prior to lamination.

U.S. Pat. No. 3,666,614 to Snedeker et al discloses glass-polycarbonate resin laminates wherein the polycarbonate surface may be covered with an abrasion resistant material which is bonded to the polycarbonate using the ethylene-vinyl acetate copolymer of the invention, or any other suitable adhesive.

U.S. Pat. No. 4,204,026 to Le Grand et al discloses a glass-polycarbonate laminate wherein the glass layer is bonded to a polycarbonate layer by means of a bonding system comprised of an aminoalkyl [poly(aryloxysiloxane)] primer and an organopolysiloxane-polycarbonate block copolymer bonding agent. It further discloses that an abrasion resistant coating, such as polyurethane, can be bonded to the polycarbonate during or subsequent to the lamination of the polycarbonate to glass.

SUMMARY OF THE INVENTION

The present invention reduces the deleterious effects of ultraviolet radiation on polycarbonate by means of ultraviolet light absorbing or excited state quenching organic compounds. The present invention involves blending a UV screening compound with tetrabutyltitanate and polymerizing the mixture on the polycarbonate surface to protect the polycarbonate from ultraviolet radiation without interfering with the bonding of the polycarbonate surface to polyurethane.

DESCRIPTION OF THE PREFERRED EMBODIMENT

The tetrabutyltitanate film of the present invention is employed at the interface between polycarbonate and polyurethane layers in a multiple laminate, which may comprise additional layers such as glass.

Suitable polycarbonate resins are described in detail in U.S. Pat. Nos. 3,666,614 and 4,200,681 referred to herein. Preferred polyurethane compositions are described in U.S. Pat. No. 3,657,057 the disclosure of which is incorporated herein by reference.

Useful organic compounds for screening the effects of ultraviolet light are well known in the art and include ultraviolet radiation absorbing materials, as well as excited state quenching materials. Suitable ultraviolet radiation screening compounds are disclosed in U.S. Pat. No. 3,004,896 and elsewhere. Preferred ultraviolet light screening compounds include o-hydroxybenzophenone, phenyl salicylate, substituted benzotriazoles, and mixtures thereof. Tetrabutyltitanate itself provides some ultraviolet radiation attenuation.

In accordance with the present invention, a solution of a UV screening material and tetrabutyltitanate is applied to a polycarbonate surface whereupon it is cured to form a hard crosslinked film, typically less than 0.001 inch (about 0.025 millimeters) thick. In a preferred embodiment, an ultraviolet screening material and tetrabutyltitanate are blended in a ratio of from about 1:1 to about 4:1 in solution in a suitable solvent, preferably containing alcohol, at a total concentration of about 1 to 4 percent.

The solution is applied by any convenient method, such as spraying or flow coating, onto the polycarbonate surface. Upon curing, the tetrabutyltitanate polymerizes to a hard crosslinked film. Various time and temperature curing cycles are suitable for curing the film, subject to the limitations imposed by the polycarbonate. Various other film forming materials such as urethanes and siloxanes may have undesirable effects either on the polycarbonate or on its bonding to polyurethane. A preferred curing cycle for the tetrabutyltitanate is about one hour at 250° F. (about 121° C.).

The cured tetrabutyltitanate film containing the ultraviolet radiation screening material protects the polycarbonate from degradation but does not hinder subsequent lamination of polyurethane to the treated polycarbonate surface. Polyurethane may be laminated to the treated polycarbonate surface according to conventional techniques. The present invention will be further understood from the description of a specific example which follows.

EXAMPLE I

A solution is prepared containing 0.5 percent tetrabutyltitanate, 0.3 percent o-hydroxybenzophenone and 0.6 percent Tinuvin 328, a substituted benzotriazole (1-benzotriazole, 2-hydroxy, 3,5-isopentylbenzene) available from CIBA-GEIGY. The solvent is 4 parts by volume isopropanol and 1 part diacetone alcohol. The solution is sprayed onto a polycarbonate surface which is then heated to 250° F. (about 121° C.) for one hour to cure the tetrabutyltitanate to form a hard crosslinked film. The treated polycarbonate is thus protected from ultraviolet radiation degradation. Protection of the polycarbonate surface from abrasion is obtained by applying a coating of abrasion-resistant polyurethane over the treated polycarbonate surface. The ultraviolet radiation protection afforded by the present invention is illustrated in Table I which compares the transmittance of various wavelengths of radiation through a polycarbonate sheet, an equivalent polycarbonate sheet with a polyurethane coating on both surfaces, and an equivalent polyurethane coated polycarbonate sheet with the intermediate ultraviolet radiation screening tetrabutyltitanate film of the present example.

TABLE I

| Wavelength (nanometers) | Percent Transmittance of Ultraviolet Radiation | | |
|---|---|---|---|
| | Polycarbonate | PC With Polyurethane Coatings | PUR Coated PC With TBT Film |
| 350 | 89 | 79 | 3.5 |
| 325 | 86 | 60 | 2.0 |
| 300 | 77 | 42 | 0 |
| 290 | 60 | 33 | 0 |
| 270 | 10 | 7 | 0 |
| 250 | 0 | 0 | 0 |
| 230 | 0 | 0 | 0 |

The above example is offered to illustrate the present invention, the scope of which is defined by the following claims.

What is claimed is:

1. A method for reducing the ultraviolet radiation degradation of polycarbonate which comprises the steps of:
   a. applying a solution consisting essentially of an organic ultraviolet radiation screening compound and tetrabutyltitanate onto a polycarbonate surface; and
   b. curing the tetrabutyltitanate to form a hard cross-linked film.

2. The method according to claim 1, wherein the organic ultraviolet radiation screening compound and tetrabutyltitanate are in solution in an alcoholic solvent.

3. The method according to claim 2, wherein the solvent comprises isopropanol.

4. The method according to claim 3, wherein the organic ultraviolet radiation screening compound is selected from the group consisting of o-hydroxybenzophenone, phenyl salicylate, substituted benzotriazoles and mixtures thereof.

5. The method according to claim 4, wherein the ratio of organic ultraviolet radiation screening compound to tetrabutyltitanate is from 1:1 to 4:1.

6. An article comprising a polycarbonate substrate, on at least one major surface of which is a film consisting essentially of tetrabutyltitanate containing an organic ultraviolet radiation screening compound.

7. The article of claim 6, wherein the organic ultraviolet radiation screening compound is selected from the group consisting of o-hydroxybenzophenone, phenyl salicylate, substituted benzotriazoles and mixtures thereof.

8. In a method of laminating polyurethane to polycarbonate, the improvement which comprises applying to the polycarbonate surface a film forming composition comprising tetrabutyltitanate and an organic ultraviolet radiation screening compound and curing the tetrabutyltitanate prior to bonding the polyurethane and polycarbonate surfaces.

9. A laminated article which comprises:
   a. at least one ply of polycarbonate;
   b. at least one ply of polyurethane bonded to said polycarbonate ply; and
   c. a tetrabutyltitanate film comprising an organic ultraviolet radiation screening compound at the interface of said polyurethane and polycarbonate plies.

10. An article according to claim 9, wherein said organic ultraviolet radiation screening compound is selected from the group consisting of o-hydroxybenzophenone, phenyl salicylate, substituted benzotriazoles and mixtures thereof.

* * * * *